United States Patent
Tanaka et al.

(10) Patent No.: US 8,565,189 B2
(45) Date of Patent: Oct. 22, 2013

(54) MOBILE COMMUNICATION METHOD, MOBILE SWITCHING CENTER, AND RADIO BASE STATION

(75) Inventors: Itsuma Tanaka, Yokohama (JP); Keisuke Suzuki, Yokosuka (JP); Akimichi Tanabe, Kawasaki (JP)

(73) Assignee: NTT DoCoMo, Inc., Tokyo (JP)

( * ) Notice: Subject to any disclaimer, the term of this patent is extended or adjusted under 35 U.S.C. 154(b) by 120 days.

(21) Appl. No.: 13/059,824

(22) PCT Filed: Aug. 18, 2009

(86) PCT No.: PCT/JP2009/064452
§ 371 (c)(1),
(2), (4) Date: Apr. 27, 2011

(87) PCT Pub. No.: WO2010/021324
PCT Pub. Date: Feb. 25, 2010

(65) Prior Publication Data
US 2011/0199893 A1 Aug. 18, 2011

(30) Foreign Application Priority Data
Aug. 18, 2008 (JP) ................. P2008-210197

(51) Int. Cl.
*H04W 4/00* (2009.01)
(52) U.S. Cl.
USPC ............ 370/331; 370/389; 370/392; 709/229
(58) Field of Classification Search
None
See application file for complete search history.

(56) References Cited

U.S. PATENT DOCUMENTS

| | | | | | |
|---|---|---|---|---|---|
| 5,961,601 | A | * | 10/1999 | Iyengar | .......... 709/229 |
| 2008/0049677 | A1 | * | 2/2008 | Hayashi | .......... 370/331 |
| 2010/0208624 | A1 | * | 8/2010 | Vikberg et al. | ........... 370/259 |
| 2010/0331011 | A1 | * | 12/2010 | Vikberg et al. | ......... 455/456.1 |
| 2011/0009130 | A1 | * | 1/2011 | Wu | .......... 455/456.1 |
| 2011/0188470 | A1 | * | 8/2011 | Lu et al. | .......... 370/331 |

OTHER PUBLICATIONS

3GPP TSG RAG WG2 LTE RRC Ad Hoc, R2-082962; "CS Fallback Procedure" NTT DOCOMO; Sophia Antipolis; Jun. 5-6, 2008 (13 pages).
3GPP TS 23.272 V8.3.0; "3rd Generation Partnership Project; Technical Specification Group Services and System Aspects; Circuit Switched Fallback in Evolved Packet System; Stage 2"; Mar. 2009 (47 pages).
3GPP TS 24.301 V8.1.0; "3rd Generation Partnership Project; Technical Specification Group Core Network and Terminals; Non-Access-Stratum (NAS) protocol for Evolved Packet System (EPS); Stage 3"; Mar. 2009 (250 pages).

(Continued)

*Primary Examiner* — Andrew Chriss
*Assistant Examiner* — Salvador E Rivas
(74) *Attorney, Agent, or Firm* — Osha Liang LLP (57) ABSTRACT

A CSFB processing unit (14) of a mobile switching center (MME) of according to the present invention is configured not to perform CSFB processing to enable a mobile station (UE), which establishes a bearer in a core network of a mobile communication system of the LTE scheme, to start CS communication in a mobile communication system of the WCDMA scheme, when CS communication of the mobile station (UE) in the mobile communication system of the WCDMA scheme is restricted in a specified area, even when the mobile switching center (MME) of the mobile communication system of the LTE scheme detects that a service request signal transmitted by the mobile station contains the first identification information.

6 Claims, 7 Drawing Sheets

(56) References Cited

OTHER PUBLICATIONS

International Search Report w/translation from PCT/JP2009/064452 dated Nov. 17, 2009 (2 pages).

Office Action for European Patent Application No. 09808260.5 dated Nov. 7, 2012 (8 pages).

3GPP TSG CT WG1 Meeting #55, C1-083292, "Update the description of paging for non-EPS services procedure," Huawei, Budapest, Hungary, Aug. 18-22, 2008 (3 pages).

3GPP TSG-RAN WG5 meeting#40, R5-083351, "List of test cases/scenarios proposal for 3G Long Term Evolution Terminal Protocol Conformance Test Specifications WI (LTE-UEConTest_SIG)," NEC, Motorola (rapporteurs), Ericsson, Huawei, NTT DOCOMO, Nokia Qualcomm, RIM, T-Mobile, Jeju, Korea, Aug. 18-22, 2008 (70 pages).

Office Action for Korean Patent Application No. 10-2011-7004238 dated Aug. 20, 2012, with English translation thereof (7 pages).

3GPP TS 23.272 V8.0.0; "3rd Generation Partnership Project; Technical Specification Group Services and System Aspects; Circuit Switched Fallback in Evolved Packet System; Stage 2 (Release 8)"; Jun. 2008 (41 pages).

3GPP TS 24.301 V0.4.0; "3rd Generation Partnership Project; Technical Specification Group Core Network and Terminals; Non-Access-Stratum (NAS) protocol for Evolved Packet System (EPS); Stage 3 (Release 8)"; Jul. 2008 (141 pages).

Office Action in corresponding Chinese application No. 200980132118.7 dated Apr. 9, 2013 (11 pages).

3GPP TS 23.272 V2.0.0; "3rd Generation Partnership Project; Technical Specification Group Services and System Aspects; Circuit Switched Fallback in Evolved Packet System; Stage 2 (Release 8)"; Jun. 2008 (41 pages).

* cited by examiner

MOBILE COMMUNICATION METHOD, MOBILE SWITCHING CENTER, AND RADIO BASE STATION

TECHNICAL FIELD

The present invention relates to a mobile communication method, a mobile switching center, and a radio base station.

BACKGROUND ART

A mobile communication system of the LTE (Long Term Evolution) scheme specified in the 3GPP does not provide circuit switched (CS) communication. Thus, a mobile station UE located in the mobile communication system of the LTE scheme is configured to perform CSFB (Circuit Switched Fallback) processing to switch to a mobile communication system of the WCDMA scheme, which provides circuit switched communication, and to start circuit switched communication.

SUMMARY OF THE INVENTION

Problem to be Solved by the Invention

General mobile communication systems can restrict specified communication in specified areas to avoid a system failure due to traffic congestion or the like.

For example, such a mobile communication system is configured to restrict circuit switched communication of a mobile station by detecting a calling signal for the circuit switched communication transmitted by the mobile station in a specified area.

However, there is a problem that such a mobile communication system cannot restrict circuit switched communication of a mobile station started by CSFB processing, because the mobile communication system cannot detect the aforementioned calling signal for the circuit switched communication in the case of the CSFB processing.

Hence, the present invention was made in light of the problem described above, and an objective of the present invention is to provide a mobile communication method, a mobile switching center, and a radio base station, which are capable of restricting circuit switched communication of a mobile station started by CSFB processing.

Solution to Problem

A first aspect of the present invention is summarized as a mobile communication method including the steps of: transmitting, at a mobile station, a service request signal in a specified area, while establishing a bearer in a core network of a first mobile communication system which does not provide circuit switched communication; performing first processing to enable the mobile station to start circuit switched communication in a second mobile communication system, when a mobile switching center of the first mobile communication system detects that the service request signal contains first identification information; and performing second processing to establish a bearer of the mobile station in a radio access network of the first mobile communication system, when the mobile switching center of the first mobile communication system detects that the service request signal contains second identification information, wherein the mobile switching center of the first mobile communication system does not perform the first processing, when circuit switched communication of the mobile station in the second mobile communication system is restricted in the specified area, even when the mobile switching center of the first mobile communication system detects that the service request signal contains the first identification information.

A second aspect of the present invention is summarized as a mobile communication method including the steps of: transmitting, at a mobile station, a service request signal in a specified area, while establishing a bearer in a core network of a first mobile communication system which does not provide circuit switched communication; performing first processing to enable the mobile station to start circuit switched communication in a second mobile communication system, when a mobile switching center of the first mobile communication system detects that the service request signal contains first identification information; and performing second processing to establish a bearer of the mobile station in a radio access network of the first mobile communication system, when the mobile switching center of the first mobile communication system detects that the service request signal contains second identification information, wherein a radio base station of the first mobile communication system stops the first processing, when being notified that circuit switched communication of the mobile station in the second mobile communication system is restricted in the specified area, and when receiving a first processing signal from the mobile switching center of the first mobile communication system.

A third aspect of the present invention is summarized as a mobile communication method including the steps of: transmitting, at a mobile station, a service request signal as a first protocol signal, which is terminated between the mobile station and a mobile switching center of a first mobile communication system which does not provide circuit switched communication, in a specified area, while establishing a bearer in a core network of the first mobile communication system; performing first processing to enable the mobile station to start circuit switched communication in a second mobile communication system, when a mobile switching center of the first mobile communication system detects that the service request signal contains first identification information; and performing second processing to establish a bearer of the mobile station in a radio access network of the first mobile communication system, when the mobile switching center of the first mobile communication system detects that the service request signal contains second identification information, wherein a radio base station of the first mobile communication system does not transfer the service request signal to the mobile switching center of the first mobile communication system, when a result of receiving and analyzing the first protocol signal, a second protocol signal which is used for convey the first protocol signal and terminated between the mobile station and the radio base station, or a third protocol signal which is terminated between the radio base station and the mobile switching center of the first mobile communication system indicates that the first protocol signal, the second protocol signal or the third protocol signal corresponds to the service request signal which contains the first identification information, and when the radio base station is notified that circuit switched communication of the mobile station in the second mobile communication system is restricted in the specified area.

A fourth aspect of the present invention is summarized as a mobile communication method including the steps of: transmitting, at a mobile station, a service request signal in a specified area, while establishing a bearer in a core network of a first mobile communication system which does not provide circuit switched communication; performing first processing to enable the mobile station to start circuit switched communication in a second mobile communication system, when a mobile switching center of the first mobile communication system detects that the service request signal contains first identification information; and performing second processing to establish a bearer of the mobile station in a radio access network of the first mobile communication system, when the mobile switching center of the first mobile communication system detects that the service request signal contains second identification information, wherein a radio access network apparatus of the second mobile communication system stops the first processing, when circuit switched communication of the mobile station in the second mobile communication system is restricted in the specified area, and when a radio access network apparatus of the second mobile communication system receives a signal of the mobile station requesting a switch to the second mobile communication system.

A fifth aspect of the present invention is summarized as a mobile communication method including the steps of: transmitting, at a mobile station, a service request signal in a specified area, while establishing a bearer in a core network of a first mobile communication system which does not provide circuit switched communication; performing first processing to enable the mobile station to start circuit switched communication in a second mobile communication system, when a mobile switching center of the first mobile communication system detects that the service request signal contains first identification information; and performing second processing to establish a bearer of the mobile station in a radio access network of the first mobile communication system, when the mobile switching center of the first mobile communication system detects that the service request signal contains second identification information, wherein the mobile station stops the first processing, when receiving a signal of the mobile station requesting a switch to the second mobile communication system from a radio access network apparatus of the second mobile communication system, the signal including restriction information indicating that circuit switched communication of the mobile station in the second mobile communication system is restricted in the specified area.

A sixth aspect of the present invention is summarized as a mobile switching center of a first mobile communication system which does not provide circuit switched communication, including: a first processing unit configured to perform first processing to enable a mobile station to start circuit switched communication in a second mobile communication system, when the mobile switching center detects that first identification information is contained in a service request signal transmitted in a specified area by a mobile station which establishes a bearer in a core network of the first mobile communication system; and a second processing unit configured to perform second processing to establish a bearer of the mobile station in a radio access network of the first mobile communication system, when the mobile switching center detects that second identification information is contained in the service request signal, wherein the first processing unit is configured not to perform the first processing, when circuit switched communication of the mobile station in the second mobile communication system is restricted in the specified area, even when the mobile switching center detects that the first identification information is contained in the service request signal.

A seventh aspect of the present invention is summarized as a radio base station of a first mobile communication system which is used in a mobile communication system wherein a mobile station transmits a service request signal including first identification information while establishing a bearer in a core network of a first mobile communication system which does not provide circuit switched communication, and first processing to enable the mobile station to start circuit switched communication in a second mobile communication system is performed when a mobile switching center of the first mobile communication system receives the service request signal; the radio base station including an analyzing unit configured to receive and analyze a first protocol signal which is terminated between the mobile station and the mobile switching center of the first mobile communication system, a second protocol signal which is used for convey the first protocol signal and terminated between the mobile station and the radio base station, or a third protocol signal which is terminated between the radio base station and the mobile switching center of the first mobile communication system, wherein the analyzing unit is configured not to transfer the service request signal to the mobile switching center of the first mobile communication system, when a result of receiving and analyzing the first protocol signal, the second protocol signal or the third protocol signal indicates that the first protocol signal, the second protocol signal or the third protocol signal corresponds to the service request signal which contains the first identification information, and when the radio base station is notified that circuit switched communication of the mobile station in the second mobile communication system is restricted in the specified area.

Effect of the Invention

As described above, according to the present invention, it is possible to provide a mobile communication method, a mobile switching center, and a radio base station, which are capable of restricting circuit switched communication of a mobile station started by CSFB processing.

MODE FOR CARRYING OUT THE INVENTION (Configuration of a Mobile Communication System According to a First Embodiment of the Present Invention)

A configuration of a mobile communication system according to a first embodiment of the present invention will be described with reference to FIGS. 1 to 3.

Figure 1:
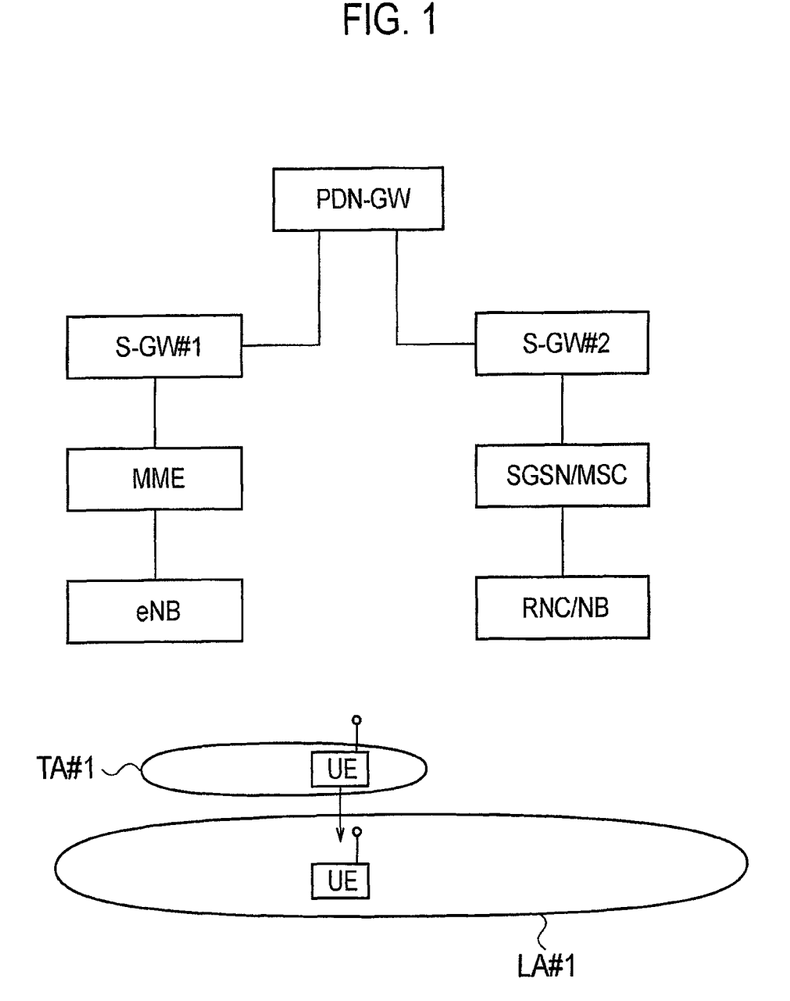
FIG. 1 is an overall configuration diagram of a mobile communication system according to a first embodiment of the present invention.

As shown in FIG. 1, the mobile communication system according to the embodiment includes a gateway apparatus PDN-GW, a serving gateway apparatus S-GW#1 of a mobile communication system of the LTE scheme (first mobile communication system), a mobile switching center MME (Mobility Management Entity) of the mobile communication system of the LTE scheme, a radio base station eNB of the mobile communication system of the LTE scheme, a serving gateway apparatus S-GW#2 of a mobile communication system of the WCDMA scheme (second mobile communication system), mobile switching centers (switching exchange for packet switched communication SGSN and switching exchange for circuit switched communication MSC) of the WCDMA mobile communication system, and radio access network apparatuses (radio controller RNC and radio base station eNB) of the mobile communication system of the WCDMA scheme.

In addition, as shown in FIG. 1, a tracking area TA#1 under the control of the mobile communication system of the LTE scheme geographically overlaps a location area LA#1 under the control of the mobile communication system of the WCDMA scheme in part.

Furthermore, the mobile communication system of the LTE scheme does not provide CS communication, while the mobile communication system of the WCDMA scheme provides CS communication.

In addition, a mobile station UE located in the mobile communication system of the LTE scheme always establishes a bearer in a core network of the mobile communication system of the LTE scheme.

Note that the embodiment will be described for an example case in which the mobile station UE in the tracking area TA#1 performs CSFB processing and thereby starts CS communication in the location area LA#1 under the control of the mobile communication system of the WCDMA scheme.

Figure 2:
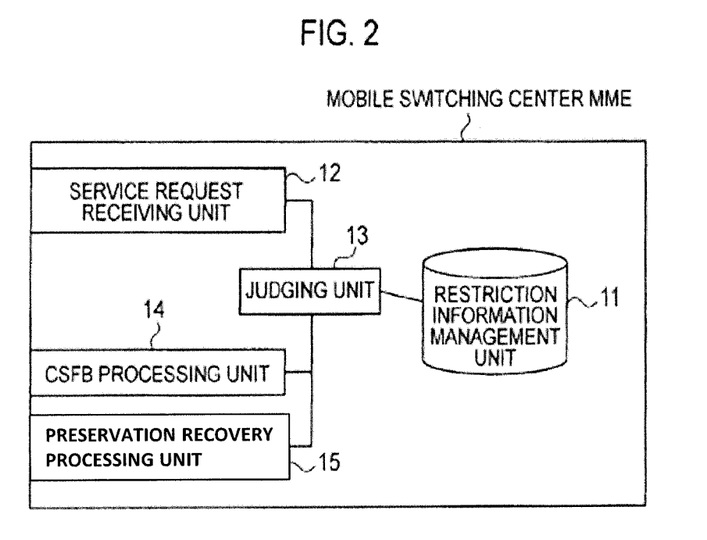
FIG. 2 is a functional block diagram of a mobile switching center according to the first embodiment of the present invention.

As shown in FIG. 2, the mobile switching center MME includes a restriction information management unit 11, a Service Request receiving unit 12, a judging unit 13, a CSFB processing unit 14, and a Preservation recovery processing unit 15.

The restriction information management unit 11 is configured to manage restriction information in the mobile communication system of the LTE scheme, and restriction information in the mobile communication system of the WCDMA scheme.

For example, restriction information in the mobile communication system of the WCDMA scheme indicates that CS communication (only transmission or transmission and reception) of the mobile station UE in the mobile communication system of the WCDMA scheme is restricted in a specified area.

The restriction information management unit 11 is configured to be regularly notified of restriction information in the mobile communication system of the WCDMA scheme from a specified apparatus of the mobile communication system of the WCDMA scheme.

The Service Request receiving unit 12 is configured to receive a "Service Request (service request signal)" transmitted by the mobile station UE located in the mobile communication system of the LTE scheme.

Here, the "Service Request" is a NAS protocol signal (first protocol signal which terminates between the mobile station and the mobile switching center MME). The "Service Request" containing first identification information is a "Service Request" for CSFB processing, while the "Service Request" containing second identification information is a "Service Request" for Preservation recovery processing.

The judging unit 13 is configured to judge whether the "Service Request" received by the Service Request receiving unit 12 is a "Service Request" for CSFB processing or a "Service Request" for Preservation recovery processing, on the basis of identification information (first identification information or second identification information) contained in the "Service Request" received.

The CSFB processing unit 14 is configured to perform CSFB processing (first processing) to enable the mobile station UE to start CS communication in the mobile communication system of the WCDMA scheme, when detecting that the "Service Request" described above contains the first identification information.

For example, the CSFB processing unit 14 is configured to transmit an "S1 Initial UE Context Setup" as a CSFB processing signal to the radio base station eNB.

In addition, the CSFB processing unit 14 is configured not to perform the CSFB processing, when the restriction information management unit 11 manages restriction information indicating that CS communication of the mobile station UE in the mobile communication system of the WCDMA scheme is restricted in the location area LA#1 (specified area), although detecting that the "Service Request" described above contains the first identification information.

The Preservation recovery processing unit 15 is configured to perform Preservation recovery processing (second processing) to establish a bearer of the mobile station in a radio access network of the mobile communication system of the LTE scheme, when detecting that the "Service Request" contains the second identification information.

Now, an operation of the mobile communication system according to the first embodiment of the present invention will be described with reference to FIG. 3.

Figure 3:
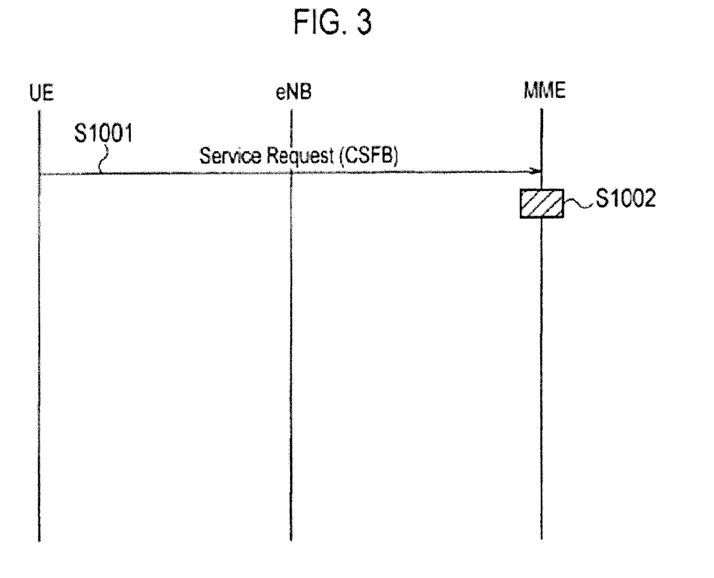
FIG. 3 is a sequence diagram showing an operation of the mobile communication system according to the first embodiment of the present invention.

As shown in FIG. 3, in step S1001, the mobile station UE in the tracking area TA#1 (specified area) transmits a "Service Request" containing the first identification information, while establishing a bearer in a core network of the mobile communication system of the LTE scheme.

In step S1002, the mobile switching center MME does not start the CSFB processing, even when detecting that the "Service Request" contains the first identification information, because the mobile switching center MME is already notified that CS communication of the mobile station UE in the mobile communication system of the WCDMA scheme is restricted in an area (specified area) corresponding to the tracking area TA#1 in the location area LA#1.

With the mobile communication system according to the first embodiment of the present invention, since the mobile switching center MME of the LTE scheme can consider restriction information in the mobile communication system of the WCDMA scheme, and judge whether or not to perform the CSFB processing, CS communication of the mobile station UE to be started by the CSFB processing in the mobile communication system of the WCDMA scheme can be restricted.

MODIFIED EXAMPLE 1

A mobile communication system according to a modified example 1 of the present invention will be described with reference to FIGS. 4 and 5. The following description will be given focusing on the differences between the mobile communication system according to the modified example 1 and the mobile communication system according to the first embodiment described above.

Figure 4:
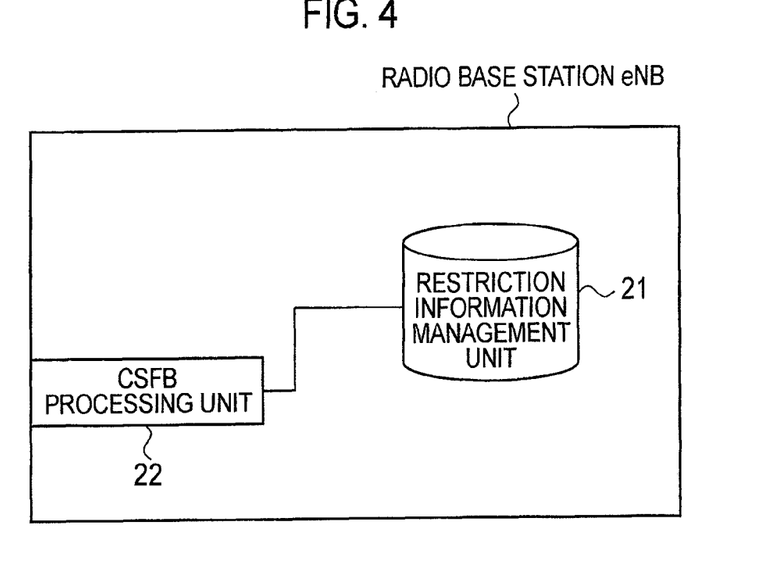
FIG. 4 is a functional block diagram of a radio base station according to a modified example 1 of the present invention.

As shown in FIG. 4, the radio base station eNB includes a restriction information management unit 21 and a CSFB processing unit 22.

The restriction information management unit 21 is provided with a function similar to the restriction information management unit 11 of the mobile switching center MME as shown in FIG. 2.

The CSFB processing unit 22 is configured to perform CSFB processing, when receiving an "S1 Initial UE Context Setup" as a CSFB processing signal from the mobile switching center MME.

In addition, the CSFB processing unit 22 is configured not to perform the CSFB processing, when the restriction information management unit 21 manages restriction information indicating that CS communication of the mobile station UE in the mobile communication system of the WCDMA scheme is restricted in the location area LA#1 (specified area), although the CSFB processing unit 22 has received an "S1 Initial UE Context Setup".

Here, an operation of a mobile communication system according to the modified example 1 will be described with reference to FIG. 5.

Figure 5:
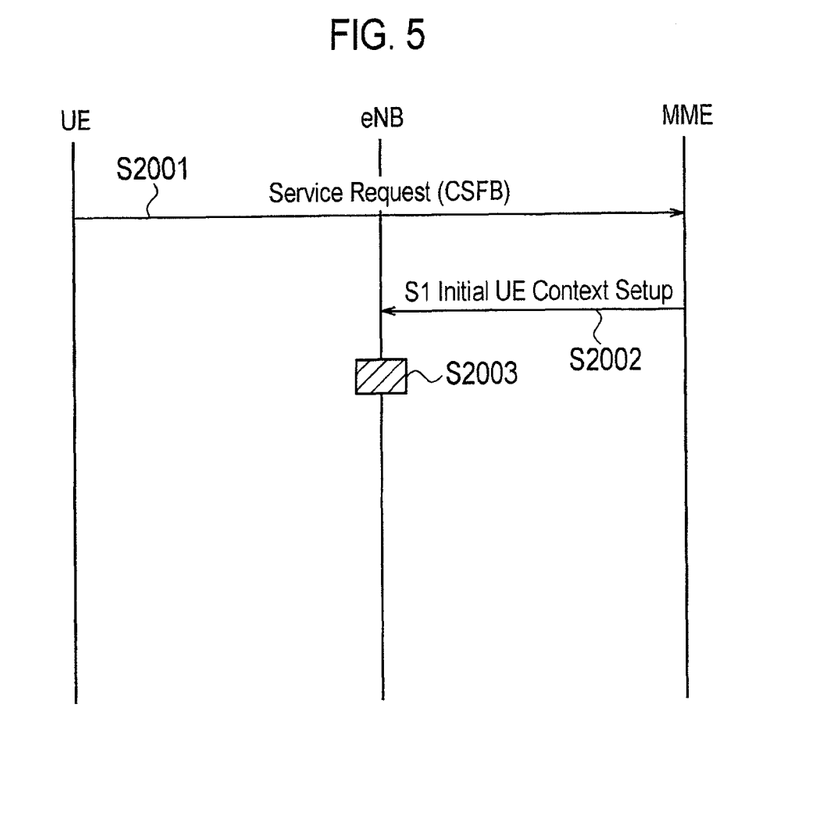
FIG. 5 is a sequence diagram showing operation of a mobile communication system according to the modified example 1 of the present invention.

As shown in FIG. 5, in step S2001, the mobile station UE in the tracking area TA#1 (specified area) transmits a "Service Request" containing the first identification information, while establishing a bearer in a core network of the mobile communication system of the LTE scheme.

In step S2002, the mobile switching center MME detects that the "Service Request" described above contains the first identification information, and transmits an "S1 Initial UE Context Setup" as a CSFB processing signal, to the radio base station eNB.

In step S2003, the radio base station eNB stops the CSFB processing, because the radio base station eNB is already notified that CS communication of the mobile station UE in the mobile communication system of the WCDMA scheme is restricted in an area (specified area) corresponding to the tracking area TA#1 in the location area LA#1.

With the mobile communication system according to the modified example 1, since a radio base station eNB of the LTE scheme can consider restriction information in the mobile communication system of the WCDMA scheme, and judge whether or not to continue the CSFB processing, CS communication of the mobile station UE to be started by the CSFB processing in the mobile communication system of the WCDMA scheme can be restricted.

MODIFIED EXAMPLE 2

A mobile communication system according to a modified example 2 of the present invention will be described with reference to FIGS. 6 and 7. The following description will be given focusing on the differences between the mobile communication system according to the modified example 2 and the mobile communication system according to the first embodiment described above.

Figure 6:
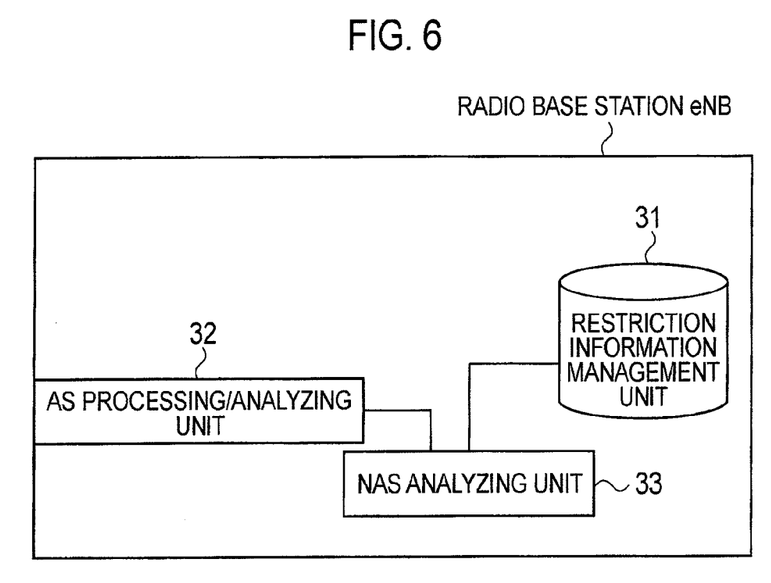
FIG. 6 is a functional block diagram of a radio base station according to a modified example 2 of the present invention.

As shown in FIG. 6, the radio base station eNB includes a restriction information management unit 31, an AS processing/analyzing unit 32, and a NAS analyzing unit 33.

The restriction information management unit 31 is provided with a function similar to the restriction information management unit 11 of the mobile switching center MME as shown in FIG. 2.

The AS processing/analyzing unit 32 is configured to perform processing related to an AS (Access Stratum) protocol (second protocol) which terminates between itself and the mobile station UE.

The NAS analyzing unit 33 is configured to receive and analyze a NAS (Non Access Stratum) protocol (first protocol) signal which terminates between the mobile station UE and a mobile switching center MME.

For example, the NAS analyzing unit 33 is configured not to transfer a "Service Request" containing the first identification information to the mobile switching center MME, when a result of receiving and analyzing a NAS protocol signal transmitted by the mobile station UE in a tracking area TA#1 (specified area) indicates that the NAS protocol signal corresponds to the "Service Request", and when the restriction information management unit 31 manages restriction information indicating that CS communication of the mobile station UE in the mobile communication system of the WCDMA scheme is restricted in an area (specified area) corresponding to the tracking area TA#1.

In addition, the NAS analyzing unit 33 may also be configured not to transfer a "Service Request" containing the first identification information to the mobile switching center MME, when a AS protocol signal corresponds to the "Service Request", and when the restriction information management unit manages restriction information indicating that CS communication of the mobile station UE in the mobile communication system of the WCDMA scheme is restricted in an area (specified area) corresponding to the tracking area TA#1, as a result of the AS processing/analyzing unit 32 receiving and analyzing the AS protocol signal transmitted by the mobile station UE in the tracking area TA#1 (specified area).

Moreover, the mobile station UE may also be configured not to transfer a "Service Request" which contains the first identification information and is transmitted by the mobile station UE in the tracking area TA#1 (specified area), to the mobile switching center MME, when a third protocol signal which terminates between the mobile switching center MME and the mobile station eNB corresponds to the "Service Request, and when the restriction information management unit 31 manages restriction information indicating that CS communication of the mobile station UE in the mobile communication system of the WCDMA scheme is restricted in an area (specified area) corresponding to the tracking area TA#1.

Here, an operation of a mobile communication system according to the modified example 2 will be described with reference to FIG. 7.

Figure 7:
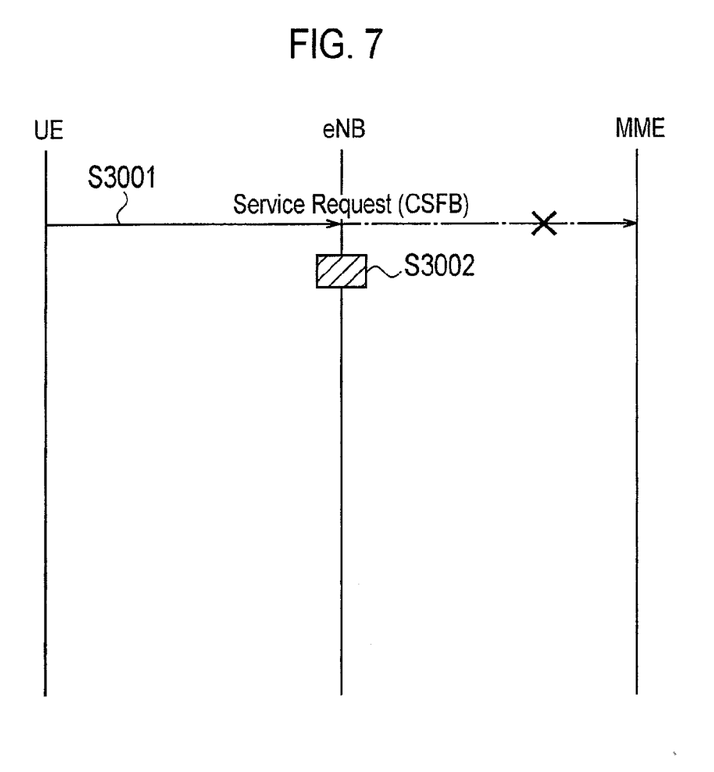
FIG. 7 is a sequence diagram showing an operation of a mobile communication system according to the modified example 2 of the present invention.

As shown in FIG. 7, in step S3001, the mobile station UE in the tracking area TA#1 (specified area) transmits a "Service Request" containing the first identification information, while establishing a bearer in a core network of the mobile communication system of the LTE scheme. Alternatively, in step S3001, the mobile station UE in the tracking area TA#1 (specified area) may also transmit the first identification information in an AS protocol signal for transmitting the "Service Request".

In step S3002, the radio base station eNB receives and analyzes the NAS protocol signal transmitted by the mobile station UE, and detects the "Service Request" containing the first identification information. Alternatively, the radio base station eNB receives the AS protocol signal transmitted by the mobile station UE and acquires the first identification information set in the AS protocol signal.

Now, the radio base station eNB does not transfer the aforementioned "Service Request" to the mobile switching center MME, because it is already notified that CS communication of the mobile station UE in the mobile communication system of the WCDMA scheme is restricted in an area (specified area) corresponding to the tracking area TA#1.

With the mobile communication system according to the modified example 2, since the radio base station eNB of the LTE scheme is configured to judge whether or not to transfer a "Service Request" containing the first identification information to the mobile switching center MME, in consideration of restriction information in the mobile communication system of the WCDMA scheme, the "Service Request" for CSFB from the mobile station UE as a restriction target in the mobile communication system of the WCDMA scheme cannot reach the mobile switching center MME. In this way, the radio base station eNB is configured to prevent CSFB processing from being performed. Accordingly, CS communication of the mobile station UE started by the CSFB processing to the mobile communication system of the WCDMA scheme can be restricted.

MODIFIED EXAMPLE 3

A mobile communication system according to a modified example 3 of the present invention will be described with reference to FIG. 8. The following description will be given focusing on the differences between the mobile communication system according to the modified example 3 and the mobile communication system according to the first embodiment described above.

An operation of a mobile communication system according to the modified example 2 will be described with reference to FIG. 8.

Figure 8:
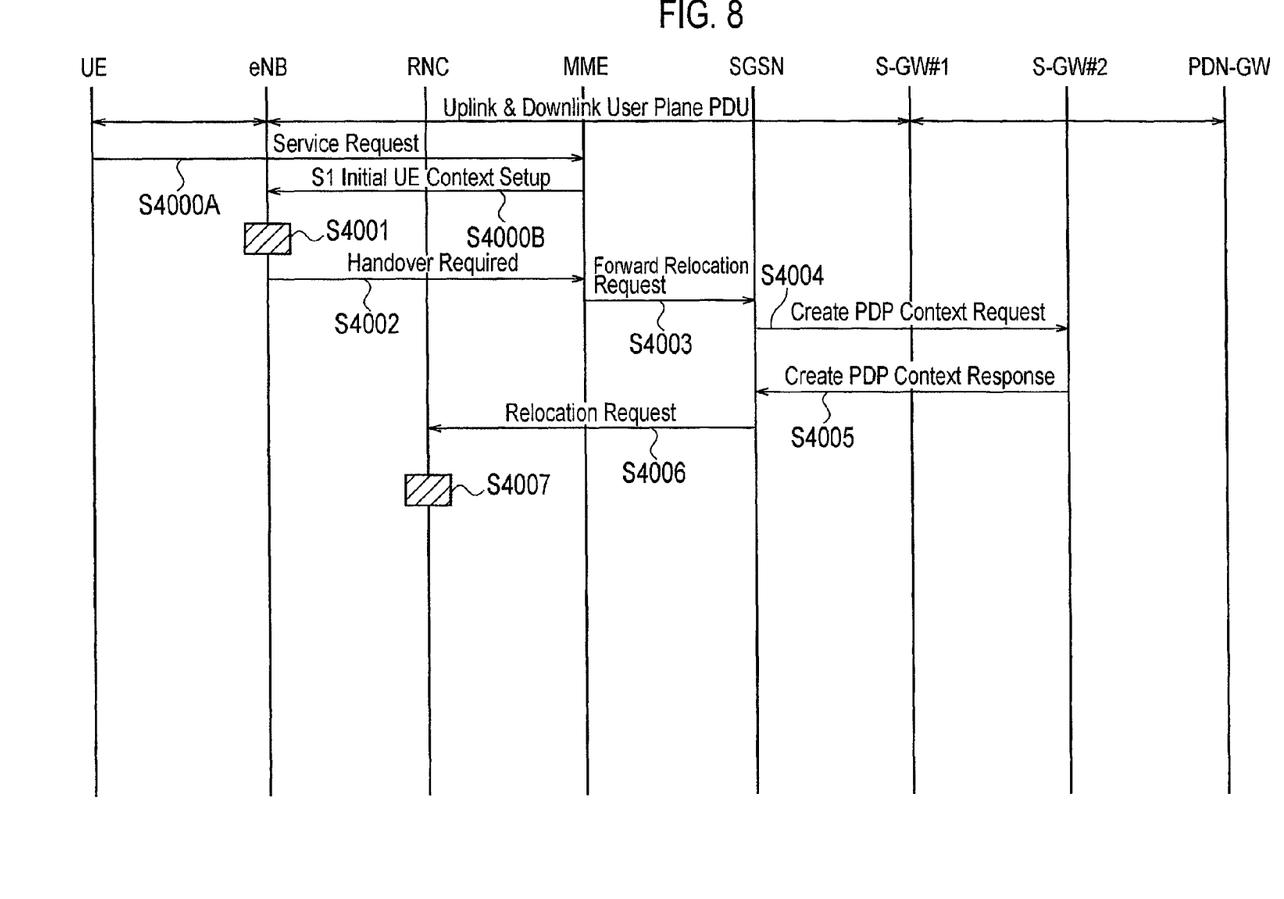
FIG. 8 is a sequence diagram showing an operation of a mobile communication system according to a modified example 3 of the present invention.

As shown in FIG. 8, in step S4000A, the mobile station UE in the tracking area TA#1 (specified area) transmits a "Service Request" containing the first identification information, while establishing bearers in a core network and a radio access network of the LTE mobile communication system, i.e. while performing PS communication in the mobile communication system of the LTE scheme.

In step S4000B, the mobile switching center MME detects that the "Service Request" described above contains the first identification information, and transmits an "S1 Initial UE Context Setup" as a CSFB processing signal, to the radio base station eNB.

In step S4001, the radio base station eNB, in response to the "S1 Initial UE Context Setup" received, determines to perform handover processing for the mobile station UE from a cell under the control of the mobile communication system of the LTE scheme to a cell under the control of the mobile communication system of the WCDMA scheme.

In step S4002, the radio base station eNB transmits a "Handover Required (handover request signal)" to a mobile switching center MME. Here, the "Handover Required" contains specific information indicating that it is a handover processing signal in CSFB processing.

In step S4003, the mobile switching center MME transmits a "Forward Relocation Request" to a mobile switching center SGSN. Here, the "Forward Relocation Request" contains specific information indicating that it is a handover processing signal in CSFB processing.

In step S4004, a mobile switching center SGSN transmits a "Create PDP Context Request" to a serving gateway apparatus S-GW#2. In step S4005, the serving gateway apparatus S-GW#2 transmits a "Create PDP Context Request" to the mobile switching center SGSN.

In step S4006, the mobile switching center SGSN transmits a "Relocation Request (signal of the mobile station UE requesting a switch to a WCDMA mobile communication system)" to the radio controller RNC. Here, the "Relocation Request" contains specific information indicating that it is a handover processing signal in CSFB processing.

In step S4007, the radio controller RNC stops the CSFB processing described above, when the radio controller RNC receives the "Relocation Request" containing the specific information, because CS communication of the mobile station UE in the mobile communication system of the WCDMA scheme is restricted in an area (specified area) corresponding to the tracking area TA#1 in the location area LA#1.

With the mobile communication system according to the modified example 3, as the radio controller RNC is configured to stop the CSFB processing described above, when receiving the "Relocation Request" containing the specific information, CS communication of the mobile station UE to be started by the CSFB processing in the mobile communication system of the WCDMA scheme can be restricted.

MODIFIED EXAMPLE 4

A mobile communication system according to a modified example 4 of the present invention will be described with reference to FIGS. 9 and 10. The following description will be given focusing on the differences between the mobile communication system according to the modified example 4 and the mobile communication system according to the first embodiment described above.

Figure 9:
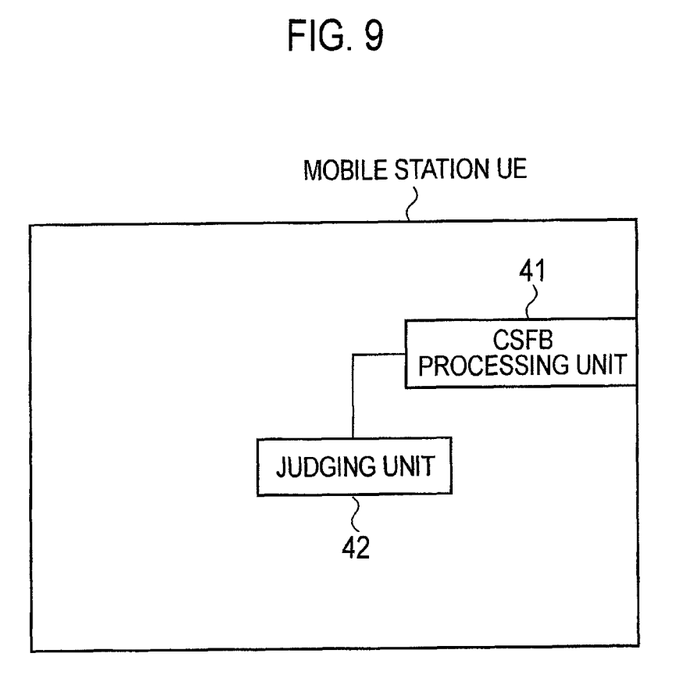
FIG. 9 is a functional block diagram of a mobile station according to a modified example 4 of the present invention.

As shown in FIG. 9, the mobile station UE includes a CSFB processing unit 41 and a judging unit 42.

The judging unit 42 is configured to judge whether or not a "HO from E-UTRAN Command (signal of the mobile station UE requesting a switch to a WCDMA mobile communication system)" received as a CSFB processing signal by the CSFB processing unit contains restriction information indicating that CS communication of the mobile station UE in the mobile communication system of the WCDMA scheme is restricted in an area (specified area) corresponding to a tracking area TA#1 where the mobile station UE is located.

The CSFB processing unit 41 is configured to perform the CSFB processing described above. The CSFB processing unit 41 is configured to stop the CSFB processing, when the judging unit 42 judges that the "O from E-UTRAN Command" received by the CSFB processing unit 41 contains the restriction information described above.

An operation of a mobile communication system according to the modified example 2 will be described with reference to FIG. 10.

Figure 10:
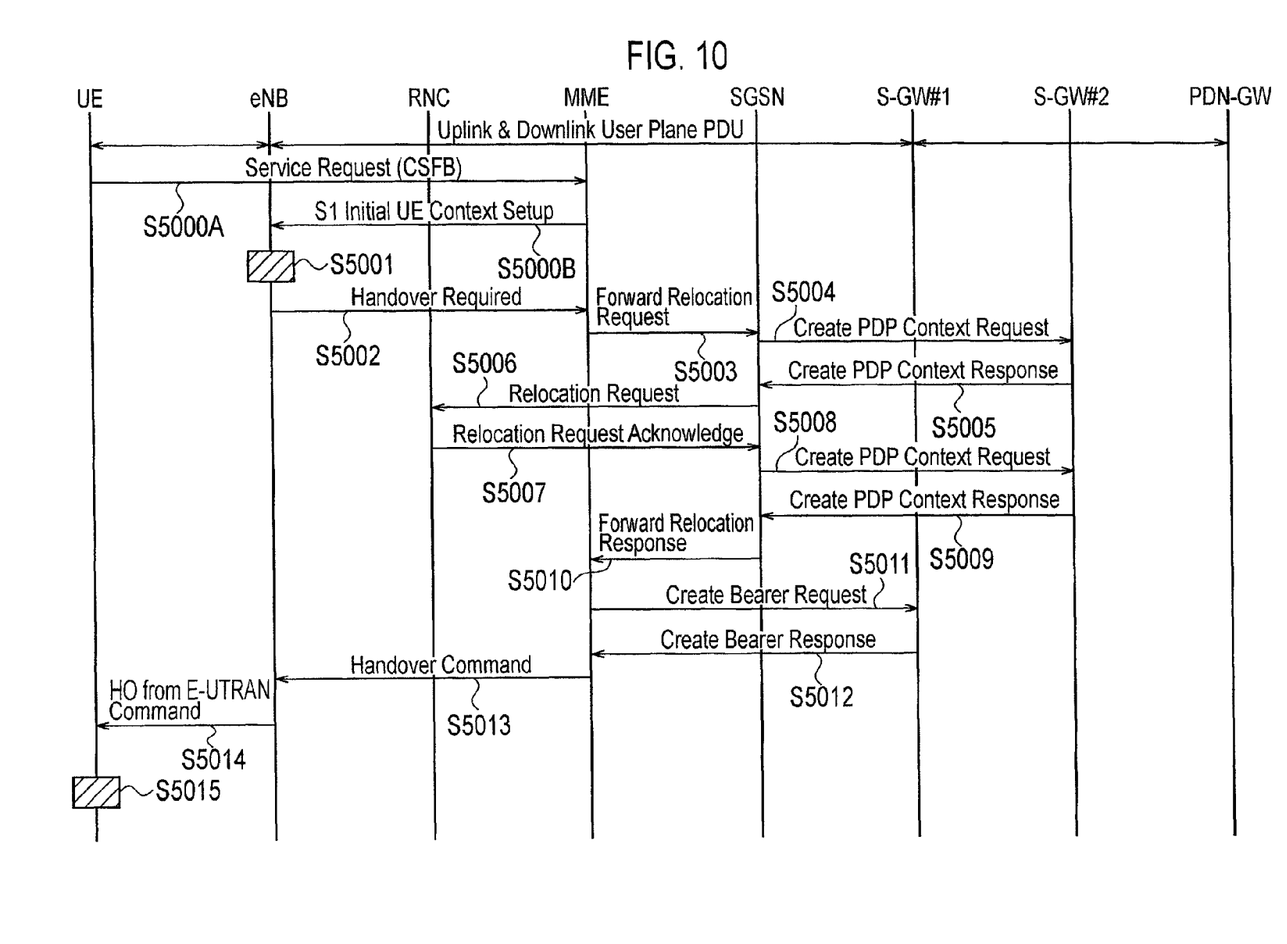
FIG. 10 is a sequence diagram showing an operation of a mobile communication system according to the modified example 4 of the present invention.

As shown in FIG. 10, the operation in steps S5000A to S5006 is identical to the operation in steps S4000A to S4006 as shown in FIG. 8.

In step S5007, the radio controller RNC transmits a "Relocation Request Acknowledge" containing the restriction information described above to the mobile switching center SGSN.

In step S5008, the mobile switching center SGSN transmits a "Create PDP Context Request" to a serving gateway apparatus S-GW#2. In step S5009, the serving gateway apparatus S-GW#2 transmits a "Create PDP Context Request" to the mobile switching center SGSN.

In step S5010, the mobile switching center SGSN transmits a "Forward Relocation Response" containing the restriction information described above to the mobile switching center MME.

In step S5011, the mobile switching center MME transmits a "Create Bearer Request" to a serving gateway apparatus S-GW#1.

In step S5012, the serving gateway apparatus S-GW#1 transmits "Create Bearer Response" to the mobile switching center MME.

In step S5013, the mobile switching center MME transmits a "Hanover Command (handover instruction signal)" containing the restriction information described above to the radio base station eNB.

In step S5014, the radio base station eNB transmits a "HO from E-UTRAN Command" containing the restriction information described above to the mobile station UE.

Instep S5015, the mobile station UE judges that the "HO from E-UTRAN Command" received contains the restriction information described above and stops the CSFB processing.

With the mobile communication system according to the modified example 3, since the restriction information (restriction information indicating that CS communication of the mobile station UE in the mobile communication system of the WCDMA scheme is restricted in an area (specified area) corresponding to the tracking area TA#1 where the mobile station UE is located) added to the "Relocation Request Acknowledge" by the radio controller RNC is notified to the mobile station UE and the mobile station UE is configured to stop the CSFB processing described above on the basis of the restriction information, CS communication of the mobile station UE to be started by the CSFB processing in the mobile communication system of the WCDMA scheme can be restricted.

Note that operation of the above described radio base station eNB, the mobile station UE, the switching center MME may be implemented by means of hardware, a software module. executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in radio base station eNB, the mobile station UE, the switching center MME. Also, the storage medium and the processor may be provided in the radio base station eNB, the mobile station UE, the switching center MME as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile communication method comprising the steps of:
    transmitting a service request signal in a specified area by a mobile station in operation with an established bearer in a core network of a mobile communication system of LTE scheme which does not provide circuit switched communication;
    performing first processing to enable the mobile station to start circuit switched communications in a mobile communication system of WCDMA scheme, when a mobile switching center in the mobile communication system of LTE scheme detects that the service request signal contains first identification information; and
    performing second processing to establish a bearer of the mobile station in a radio access network of the mobile communication system of LTE scheme, when the mobile switching center of the mobile communication system of LTE scheme detects that the service request signal contains second identification information,
    wherein
    even when detecting that the service request signal contains the first identification information, the mobile switching center of the mobile communication system of LTE scheme does not perform the first processing if circuit switched communication of the mobile station in the mobile communication system of WCDMA scheme is restricted in the specified area,
    the service request signal containing the first identification information is "Service Request" for CSFB (Circuit Switched Fallback) processing;
    the service request signal containing the second identification information is "Service Request" for Preservation recovery processing;
    the first processing is the CSFB processing; and
    the second processing is the Preservation recovery processing.

2. The mobile communication method according to claim 1, wherein
    even when the mobile switching center of the mobile communication system of LTE scheme detects that the service request signal contains the first identification information, the mobile switching center of the mobile communication system of LTE scheme refuses to start the first processing if circuit switched communication of the mobile station in the mobile communication system of WCDMA scheme is restricted in the specified area.

3. The mobile communication method according to claim 1, wherein
    even when the mobile switching center of the mobile communication system of LTE scheme detects that the service request signal contains the first identification information, the mobile switching center of the mobile communication system of LTE scheme refuses to start the first processing if circuit switched communication of the mobile station in the mobile communication system of WCDMA scheme is restricted in the specified area.

4. A mobile switching center of a mobile communication system of LTE scheme which does not provide circuit switched communication, the mobile switching center comprising:
    a first processing unit configured to, when detecting that first identification information is contained in a service request signal transmitted in a specified area by a mobile station in operation with an established bearer in a core network of the mobile communication system of LTE scheme, perform first processing to enable the mobile station to start circuit switched communication in a mobile communication system of WCDMA scheme; and
    a second processing unit configured to perform second processing to establish a bearer of the mobile station in a radio access network of the mobile communication system of LTE scheme when detecting that second identification information is contained in the service request signal,
    wherein the first processing unit is configured not to, even when detecting that the first identification information is contained in the service request signal, perform the first processing if circuit switched communication of the mobile station in the mobile communication system of WCDMA scheme is restricted in the specified area, the service request signal containing the first identification information is "Service Request" for CSFB (Circuit Switched Fallback) processing;

the service request signal containing the second identification information is "Service Request" for Preservation recovery processing;

the first processing is the CSFB processing; and the second processing is the Preservation recovery processing.

5. The mobile switching center according to claim 4, wherein even when the first processing unit detects that the service request signal contains the first identification information, the first processing unit refuses to start the first processing if circuit switched communication of the mobile station in the mobile communication system of WCDMA scheme is restricted in the specified area.

6. The mobile switching center according to claim 4, wherein even when the first processing unit detects that the service request signal contains the first identification information, the first processing unit refuses to start the first processing if circuit switched communication of the mobile station in the mobile communication system of WCDMA scheme is restricted in the specified area.

* * * * *